US009207079B2

(12) United States Patent  
Askarpour

(10) Patent No.: US 9,207,079 B2  
(45) Date of Patent: Dec. 8, 2015

(54) METHOD AND SYSTEM FOR COMPENSATING FOR SOFT IRON MAGNETIC DISTURBANCES IN A HEADING REFERENCE SYSTEM

(75) Inventor: Shahram Askarpour, Media, PA (US)

(73) Assignee: Innovative Solutions & Support, Inc., Exton, PA (US)

( * ) Notice: Subject to any disclaimer, the term of this patent is extended or adjusted under 35 U.S.C. 154(b) by 528 days.

(21) Appl. No.: 13/529,894

(22) Filed: Jun. 21, 2012

(65) Prior Publication Data

US 2013/0345972 A1    Dec. 26, 2013

(51) Int. Cl.
*G01C 17/38* (2006.01)
*G01C 19/36* (2006.01)

(52) U.S. Cl.
CPC ............. *G01C 17/38* (2013.01); *G01C 19/36* (2013.01)

(58) Field of Classification Search
CPC ....... G01C 17/38; G01C 21/165; G01C 19/36
See application file for complete search history.

(56) References Cited

U.S. PATENT DOCUMENTS

| 4,005,358 A | 1/1977 | Foner |
| 4,414,753 A | 11/1983 | Moulin et al. |
| 4,733,179 A | 3/1988 | Bauer et al. |
| 4,843,865 A | 7/1989 | Fowler |
| 5,321,631 A | 6/1994 | Germanetti |
| 5,682,335 A | 10/1997 | Assous |
| 5,737,226 A | 4/1998 | Olsen et al. |
| 5,878,370 A | 3/1999 | Olsen |
| 5,990,679 A | 11/1999 | Frommer et al. |
| 6,415,223 B1 * | 7/2002 | Lin et al. ................. 701/431 |
| 6,459,990 B1 * | 10/2002 | McCall et al. ........... 701/501 |
| 6,477,465 B1 * | 11/2002 | McCall et al. ........... 701/501 |
| 6,860,023 B2 | 3/2005 | Manfred et al. |
| 7,146,740 B2 | 12/2006 | Manfred |
| 7,162,367 B2 * | 1/2007 | Lin et al. ................. 701/472 |
| 7,587,277 B1 * | 9/2009 | Wells ........................ 701/510 |
| 8,108,171 B2 * | 1/2012 | Judd ........................... 702/93 |
| 8,275,544 B1 * | 9/2012 | Wells et al. .............. 701/501 |
| 2003/0135327 A1 * | 7/2003 | Levine et al. ............ 701/220 |
| 2014/0278183 A1 * | 9/2014 | Zheng et al. ............. 702/96 |

* cited by examiner

*Primary Examiner* — John Q Nguyen
*Assistant Examiner* — Michael Whalen
(74) *Attorney, Agent, or Firm* — Bryan Cave LLP

(57) ABSTRACT

A method and system for compensating for significant soft iron magnetic disturbances in a heading reference system, such as an aircraft heading reference system, such as an integrated standby unit; or a vehicle inertial system, provides a heading correction signal to the heading reference system when a detected difference in value between a gyro heading relative to magnetic north and a magnetometer reading during a defined measurement period exceeds a predetermined acceptable threshold value of change, such as one based on the expected gyro drift over that period. Upon receipt of the heading correction signal, the gyro heading is adjusted to maintain an accurate heading relative to true magnetic north. If this threshold value is not exceeded, then the magnetometer reading is used for the heading value. This method is iteratively repeated in order to continually maintain an accurate heading and may be employed for each heading measurement axis.

36 Claims, 3 Drawing Sheets

METHOD AND SYSTEM FOR COMPENSATING FOR SOFT IRON MAGNETIC DISTURBANCES IN A HEADING REFERENCE SYSTEM

FIELD OF THE INVENTION

The present invention relates to heading reference systems and particularly to such systems in which magnetic disturbances due to the presence of local soft iron can result in errors in magnetic heading determinations which affect the provision of a heading relative to magnetic north.

BACKGROUND OF THE INVENTION

Traditionally in heading reference systems for providing a heading relative to magnetic north, such as Attitude and Heading Reference Systems, Air Data and Attitude Heading Reference Systems, Inertial Navigation Systems, or Integrated Standby Systems of the type conventionally employed in aircraft, the heading gyro is periodically corrected by means of data from an external magnetometer that relies on the earth's magnetic field to provide a heading relative to magnetic north. However, the accuracy of such readings can significantly be affected by the presence of local soft iron, such as from local electric circuits on board the aircraft, resulting in meaningful errors in the calculation and ultimate display of the magnetic heading relative to true magnetic north. This can result in serious problems, such as with respect to the proper guidance of the aircraft along its designated flight path. Because of the seriousness of this problem, as well as the desire for a cost effective and efficient solution various attempts have been made to try and avoid these affects which, while helpful, have not totally achieved the objective. One such prior art attempt to try and avoid the effects of the local presence of soft iron which provides these undesirable magnetic disturbances, has involved carefully locating the external magnetometers in aircraft areas where there are minimal local magnetic disturbances present; however, this approach has not proved to be sufficiently cost effective and efficient since it involves locating the external magnetometers on the aircraft wings away from the other electrical devices which can cause such soft iron magnetic disturbances. Such an approach introduces a significant cost due to the presence of such factors as increased installation costs as well as the increased cost of additional units.

This problem of soft iron magnetic disturbances affecting the provision of a correct heading relative to magnetic north while significant with respect to aircraft guidance is not limited to aircraft instruments and is important as well in the guidance of other vehicles which utilize heading reference systems for guidance. Thus, the same problem can occur in any vehicle and any inertial system that normally requires a source of heading that can be subject to variations as a result of local electric field changes. Consequently, it is believed that the present invention is applicable to any magnetic heading indication system where disturbances of local soft iron can result in errors in magnetic heading determinations.

Prior art attempts at solving such problems, in applicant's view, are not as efficient or cost effective as the claimed invention and, thus, have not adequately solved the problem. Examples of other such prior art attempts, which applicant believes do not satisfactorily solve the problem, are described, by way of example, in U.S. Pat. No. 4,414,753, entitled "Process for Compensating the Magnetic Disturbances In The Determination of a Magnetic Heading and Devices for Carrying Out This Process"; U.S. Pat. No. 5,737, 226, entitled "Vehicle Compass System With Automatic Calibration"; and U.S. Pat. No. 5,878,370, entitled "Vehicle Compass System With Variable Resolution". Other prior art attempts at compensating for errors in the measurement of magnetometers, which applicant also believes do not satisfactorily solve the problem presented here, are described, by way of example in U.S. Pat. No. 5,682,335, entitled "Method and Device for Simultaneous Identification and Correction of Errors in the Measurements of a Magnetometer"; U.S. Pat. No. 7,146,740, entitled "Methods and Apparatus for Automatic Magnetic Compensation"; U.S. Pat. No. 6,860,023, entitled "Methods and Apparatus for Automatic Magnetic Compensation"; U.S. Pat. No. 5,990,679, entitled "Method Using Corrective Factors for Determining a Magnetic Gradient"; U.S. Pat. No. 5,321,631, entitled "Method and Self-Contained System for Harmonizing Equipments On Boiard a Vehicle Using Means of Measuring the Earth's Gravitational and Magnetic Fields"; U.S. Pat. No. 4,843,865, entitled "Method of Calibrating a Compass Heading"; U.S. Pat. No. 4,733,179, entitled "Method of Determining an Interference-Magnetic Field in a Motor Vehicle Provided with an Electronic Compass"; and U.S. Pat. No. 4,005,358, entitled "Magnetometer with Out-of-Phase Correction".

Thus, it is believed that there is a need for an efficient and cost effective solution for avoiding the effects of local soft iron on magnetic heading calculations in magnetic heading reference systems whether in an aircraft or any other vehicle employing such a system for proper guidance.

SUMMARY OF PARTICULAR EMBODIMENTS OF THE INVENTION

The present invention provides a method for compensating for soft iron magnetic disturbances in a heading reference system by detecting changes both in the magnetometer reading due to the presence of any soft iron magnetic disturbances and the gyro heading relative to magnetic north during a detection period, and then comparing the difference in these detected changes against a predetermined acceptable threshold value in order to determine if this difference exceeds the predetermined acceptable threshold value. If this difference exceeds the predetermined acceptable threshold value, then a heading correction signal is provided for enabling adjustment of the gyro heading in order to maintain true north in the face of the detected soft iron magnetic disturbances. If this difference does not exceed the predetermined acceptable threshold value, then the magnetometer reading is used for the heading value. The predetermined acceptable threshold value is based on the expected gyro drift over the measurement period, with the comparison of the difference in the detected values being based on whether this difference exceeds the expected gyro drift over the measurement period since the immediately previous reading. These steps are iteratively repeated over subsequent measurement periods in order to continue to maintain true magnetic north in the face of any significant soft iron magnetic disturbances.

Various compensation algorithms may be employed for various systems in accordance with the present invention, from a relatively simplistic algorithm which periodically compares the change in the magnetic heading as measured by the magnetometers against the change in heading measured by the rate sensors to much more complex approaches in which the rates of change of the magnetometers and rate sensors for each axis are compared. Typically, in accordance with the present invention, if the change is greater than the expected drift error of the rate sensors, it is assumed that the magnetometer is being affected by a local change in magnetic field and the rate sensor data is used to compensate for effects of the change in the local magnetic field.

The above method of the present invention may be employed to improve the compensation of any magnetic indication heading reference system for the presence of significant soft iron magnetic disturbances which can result in errors in magnetic heading determinations, such as in aircraft systems, such as integrated standby units or other aircraft systems employing heading reference systems, as well as in any vehicle or inertial system that requires a source of heading that may be subject to significant variations as a result of local electric field changes. Such systems may be employed as primary or secondary systems and, if desired, may utilize a Kalman filter to blend the gyro measurement with the magnetometer measurement, with the acceptable difference being dependent on the gyro error covariance.

Various benefits and features of the present invention may become apparent from the following detailed description considered in conjunction with the accompanying drawings. It is to be understood, however, that the drawings are designed solely for purposes of illustration and not as a definition of the limits of the invention for which reference should be made to the appended claims.

BRIEF DESCRIPTION OF THE DRAWINGS

Further features of the invention, its nature and various advantages will be more apparent from the following detailed description of the embodiments, taken in conjunction with the accompanying drawings in which.

DETAILED DESCRIPTION OF EMBODIMENTS OF THE INVENTION

Figure 1:
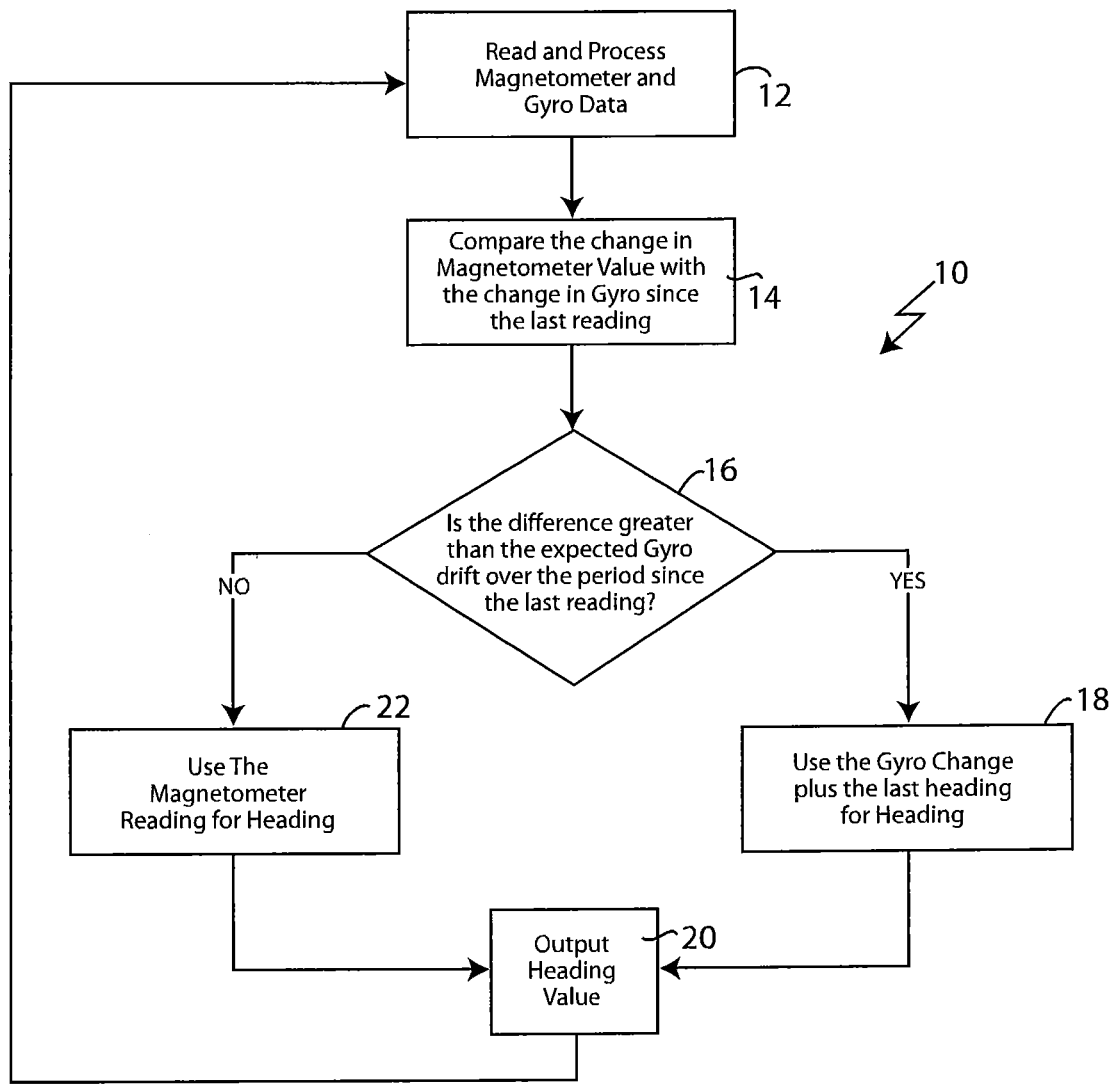
FIG. 1 is a flow chart in accordance with the method of the present invention which may be implemented in a heading reference system subject to soft iron magnetic disturbances.
Figure 2:
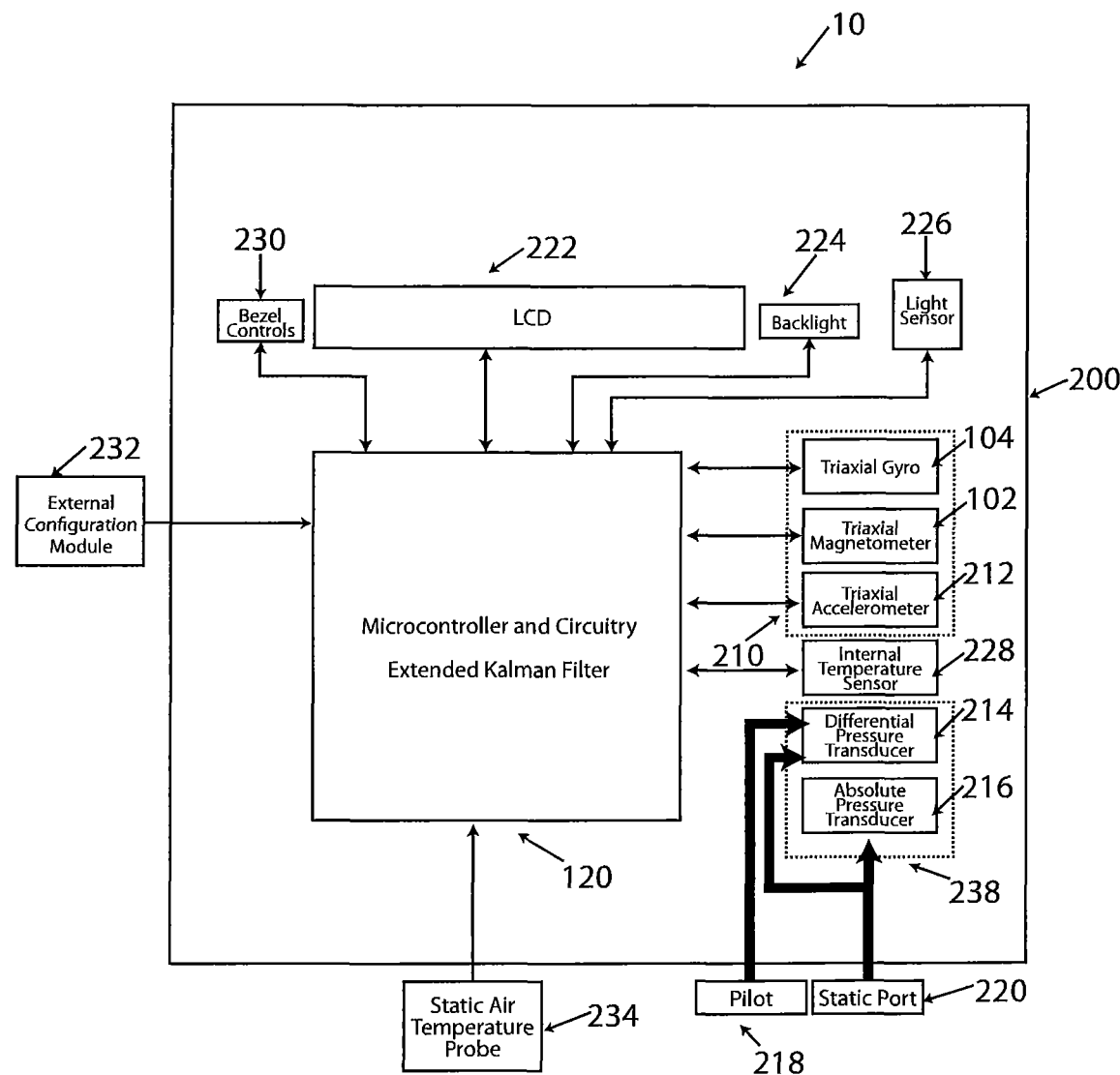
FIG. 2 is a block diagram of a typical heading reference system, such as an improved integrated standby system employing a heading reference system, implementing the method of the present invention illustrated in FIG. 1.

Referring now to the drawings in detail, and initially to FIG. 1, a flow chart is shown which illustrates the presently preferred compensation method of the present invention for minimizing the affects of soft iron magnetic disturbances in a heading reference system, such as the system 100 illustrated in FIG. 2. As will be described in greater detail hereinafter, the presently preferred compensation method of the present invention may be conventionally implemented in firmware or software housed in the conventional heading reference system 100 of the instrument, such as the integrated standby unit 200 illustrated in FIG. 2. The implementation of the compensation method of the present invention in firmware or software may readily be accomplished by one of ordinary skill in the art once the presently preferred compensation method of the present invention is understood from reference to the following description of this method below.

As shown and preferred, FIG. 1 diagrammatically illustrates a flow chart in accordance with the presently preferred compensation method of the present invention depicted as an iterative control loop 10 for repetitively compensating for any defined significant changes in the accuracy of a heading system 100 due to soft iron magnetic disturbances, such as can occur from local electric circuits adjacent to the heading reference system 100. This is preferably accomplished, as will be described in greater detail hereinafter, from a comparison of the change in the reading of the magnetometer, illustrated as a triaxial magnetometer 102 in FIG. 2, associated with the heading reference system 100, with the reading of the heading reference system gyro, illustrated as a triaxial gyro 104 in FIG. 2, against an expected gyro drift over that measurement period since the prior reading.

As illustrated in FIG. 1, the steps involved in iteratively carrying out the presently preferred compensation method of the present invention are as follows. The output data from both the magnetometer 102 and the gyro 104 are read and processed to provide signals corresponding to any change in the value of the magnetometer 102 reading and the gyro 104 reading. This step is represented by block 12 in FIG. 1. These signals are then compared to determine the actual changes in these values against each other since the previous reading. This step is represented by block 14 in FIG. 1. A determination is then made if any detected difference in value from the previous reading exceeds a predetermined acceptable threshold value which, in accordance with the present invention, is preferably defined as the expected gyro drift over the period since the prior reading. This step is represented in FIG. 1 by block 16. If as a result of this comparison the difference exceeds the expected gyro drift or acceptable threshold value, then, in accordance with the presently preferred compensation method of the present invention a corrected heading signal is provided which corresponds to the actual gyro change plus the last heading and this corrected heading signal is output to the heading reference system 100 to adjust the gyro heading to maintain accuracy. These steps are represented in FIG. 1 by blocks 18 and 20. On the other hand, if this detected difference does not exceed the predetermined acceptable threshold value, in other words, it is not greater than the expected gyro drift over this period, then the detected magnetometer 102 reading is used to provide the heading value for the gyro 104. These steps are represented by blocks 22 and 20 in FIG. 1. As previously mentioned, and as illustrated in the flow chart of FIG. 1, these steps continue to be iteratively periodically repeated in order to continue to maintain an accurate heading for the heading reference system 100 in the face of significant soft iron magnetic disturbances throughout the operation of the heading reference system 100.

The above described flow chart illustrated in FIG. 1 may be represented by the following algorithm:

In the case where:

k is a positive constant derived from expected gyro drift over the period $\Delta t$;

$\Delta MH$ is the change in magnetometer derived heading over the period $\Delta t$;

$\Delta GH$ is the change in gyro derived heading over the period $\Delta t$;

Heading=fn(GH, MH) for $\Delta H$=<k

Heading=GH and MH=MH+$\Delta H$ for $\Delta H$>k

As described above, this algorithm can be readily implemented in firmware or software, such as employed in the microprocessor 120 of the heading reference system 100, such as a Freescale microprocessor conventionally programmed in C. As noted above, the algorithm relies on the periodic correction of the heading gyro 104 only when the difference between the magnetometer 102 reading and the gyro 104 measurements is in the order of the expected gyro drift over the period since the last correction was made to the gyro 104.

Summarizing the above described compensation method, preferably the magnetometer data is read for each axis as well as the gyro data for each axis. The gyro data is converted from body to inertial coordinates. The rate of change of heading based on the magnetometer readings over time is determined. The rate of change of heading is compared with the inertial coordinate rate of change of yaw from the gyros. Then, in accordance with the method of the present invention, the algorithm records the difference in rates of change if this difference is greater than a predetermined threshold value and uses it as a bias to correct for the soft iron impact on the magnetometer. On the other hand, if this difference is not greater than the predetermined threshold value, the algorithm uses the actual magnetometer value to correct for the drift in the gyros.

In accordance with the presently preferred compensation method of the present invention, a conventional extended Kalman filter (not shown) may also be employed in order to blend the gyro 104 measurement with the magnetometer 102 measurement, with the aforementioned difference between the magnetometer 102 and the gyro 104 being the gyro error covariance.

The above method can be employed in any magnetic heading indication system in which disturbances due to the presence of local soft iron can result in errors in magnetic heading calculations. In such an instance, by placing a gyro in the heading measurement axis and comparing the magnitude of the change in the magnetometer against the change in the gyro, any significant changes in the output of the magnetometer that is due to local magnetic field changes can be detected and corrected. Thus, the compensation method of the present invention may be employed not only in aircraft heading reference systems, such as in the integrated standby unit 200 illustrated in FIG. 2, to be described in greater detail hereinafter, but in other aircraft instruments such as primary or secondary attitude and heading reference systems, air data and attitude heading reference systems, or inertial navigation systems; as well as in non-aircraft systems such as vehicle or inertial systems that require a source of heading that may be subject to variations as a result of local electric field changes.

Referring now to FIG. 2, an example of a presently preferred integrated standby unit 200 is shown which has been enhanced and improved by implementing the previously described compensation method of the present invention. As shown and preferred in FIG. 2, the integrated standby unit 200 includes an inertial measurement unit 210 which includes triads of conventional accelerometers 212, gyros 104 and magnetometers 102, with the compensation method of the present invention being utilized with the gyros 104 and magnetometers 102 as described above. As shown and preferred, the integrated standby unit 200 may also include an integral air data measurement module 238 for conventional measurement of airspeed and altitude. The integrated standby unit 200 also preferably includes a conventional differential pressure transducer 214 and conventional absolute pressure transducer 216 fed by pitot 218 and a static port 220 as shown. In addition, the standby unit 200 also preferably includes a conventional LCD display 222, backlight 224, light sensor 226, internal temperature sensor 228, and bezel controls 230. As further shown and preferred in FIG. 2, the microprocessor 120 receives external inputs from an external configuration module 232 and a static air temperature probe 234.

Thus, the above integrated standby unit 200 illustrated in FIG. 2, comprises a series of temperature, pressure, magnetic, acceleration and rate sensors controlled by a microprocessor, such as a Freescale IMX series microprocessor, and presented on an LCD display. As such, the integrated standby system 200 provides for measurement, computation and display of flight critical information, including indicated and true airspeed, mach, static air temperature, altitude, pitch, roll, slip angle and magnetic heading. If desired, the integrated standby system 200 can be further augmented with GPS or other navigation sensors to also provide for display of course, wind and other navigational information.

In the system 200 illustrated in FIG. 2, the initial attitude and heading information is determined by means of the triaxial accelerometers 212 and magnetometers 102. At initialization, the vehicle or aircraft is assumed to be in zero acceleration state and, therefore, the combination of accelerometers 212 and magnetometers 102 provide an accurate initial state for pitch, roll and heading of the aircraft.

In the operational phase of the integrated standby unit 200, the triaxial rate sensors are preferably utilized to determine the current attitude and heading of the aircraft by monitoring and compensating for changes from the initial state. Computed angles based on rate sensor data normally suffer from a random drift, generally referred to as random walk. This drift is normally due to integration of the noise which is in the signal bandwidth and, thus, is not easily filtered by traditional signal conditioning algorithms. In order to compensate for this drift in the method of the present invention, the gyro outputs are periodically recalibrated against the magnetometer and accelerometer data. Variations of an extended Kalman filter are preferably used to periodically correct for the rate sensors drift as well as to blend all sensor data based on their corresponding error covariance. These blending and compensating algorithms provide for an accurate estimate of the aircraft attitude and heading. An example of such a blending algorithm is provided below:

$$\vec{i} = \frac{\vec{v_1}}{|\vec{v_1}|} \quad \vec{i_D} = \frac{\vec{B_D}}{|\vec{B_D}|} \quad \vec{i_E} = \frac{\vec{B_E}}{|\vec{B_E}|}$$

$$\vec{j} = \frac{\vec{v_1} \times \vec{v_2}}{|\vec{v_1}|} \quad \vec{j_D} = \frac{\vec{B_D} \times \vec{G_D}}{|\vec{B_D} \times \vec{G_D}|} \quad \vec{j_E} = \frac{\vec{B_E} \times \vec{G_E}}{|\vec{B_E} \times \vec{G_E}|}$$

$$\vec{k} = \vec{i} \times \vec{j} \quad \vec{k_D} = \vec{i_D} \times \vec{j_D} \quad \vec{k_E} = \vec{i_E} \times \vec{j_E}$$

$$R_{D \to I} = \begin{bmatrix} i_{Dx} & j_{Dx} & k_{Dx} \\ i_{Dy} & j_{Dy} & k_{Dy} \\ i_{Dz} & j_{Dz} & k_{Dz} \end{bmatrix}$$

$$R_{E \to I} = \begin{bmatrix} i_{Ex} & j_{Ex} & k_{Ex} \\ i_{Ey} & j_{Ey} & k_{Ey} \\ i_{Ez} & j_{Ez} & k_{Ez} \end{bmatrix}.$$

$$R_{D \to E} = R_{D \to I} \cdot R_{I \to E}$$

$$\vec{v_D} \cdot R_{d \to E} = \vec{v_E}$$

A variation of the above algorithm can be used to update the attitude estimate utilizing a variation of a Kalman filter, such as illustrated below:

$$\hat{x}_{k|k-1} = F_k \hat{x}_{k-1|k-1} + B_k u_k$$

$$P_{k|k-1} = F_k P_{k-1|k-1} F_k^T + Q_k$$

$$\hat{y}_k = z_k - H_k \hat{x}_{k|k-1}$$

$$S_k = H_k P_{k|k-1} H_k^T + R_k$$

$$K_k = P_{k|k-1} H_k^T S_k^{-1}$$

$$\hat{x}_{k|k} = \hat{x}_{k|k-1} + K_k \hat{y}_k$$

$$P_{k|k} = (I - K_k H_k) P_{k|k-1}$$

As is well known, the local magnetic environment which surrounds the standby unit 200 in a typical aircraft panel installation is subject to variations such as magnetic effects of power switching to a nearby instrument. At install time, the standby unit 200 would preferably be calibrated in its intended environment to compensate for the effects of the local environment. However, in the course of a typical flight, various equipment is normally turned on or off which could result in an error in the magnetic heading measured by the internal magnetometers. The method of the present invention enables the system to compensate for these errors, with the algorithm ΔH>k detecting their occurrence and compensating for the resultant error above a predetermined threshold value.

Figure 3:
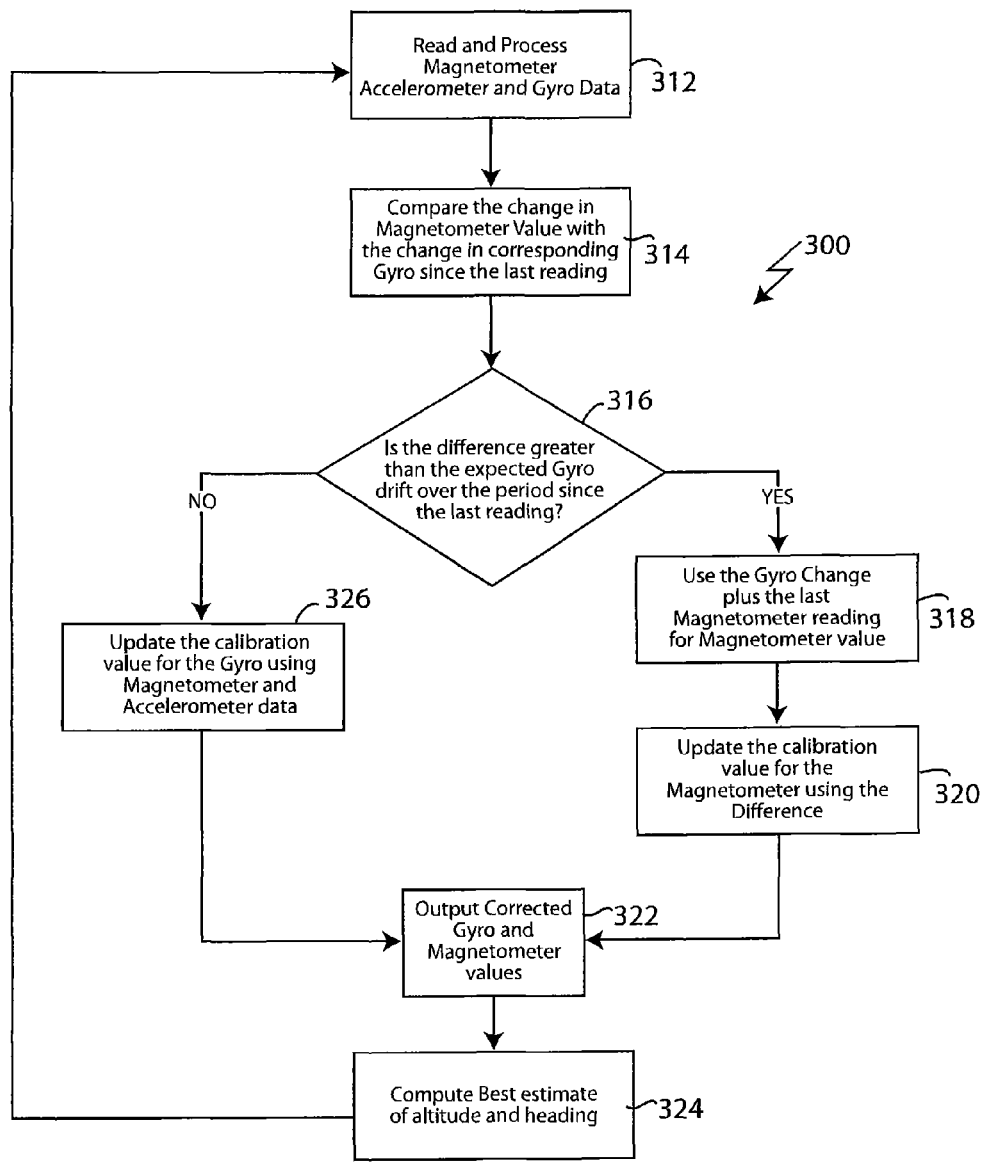
FIG. 3 is a flow chart, similar to FIG. 1, in accordance with the method of the present invention, which may, alternatively, be implemented in the heading reference system of FIG. 2.

It will be appreciated by one of ordinary skill in the art that numerous compensation algorithms may be used for various systems without departing from the spirit and scope of the present invention. Thus, the compensation algorithm may range from a relatively simple algorithm that periodically compares the change in the magnetic heading as measured by the magnetometers against the change in heading measured by the rate sensors, such as illustrated in FIG. 1 and represented by the previously enumerated expression:

Heading=fn(GH, MH) for ΔH=<k
Heading=GH and MH=MH+ΔH for ΔH>k to more complex or elaborate schemes in which the rates of change of the magnetometers and rate sensors for each axis are compared, such as represented by the flow chart of FIG. 3 and the following expression:

In the case where:

XGI, YGI, ZGI represent change of angle in X, Y, Z axis as derived from gyros in inertial reference and XM, YM, ZM represent X, Y, Z magnetometer readings and XKI, YKI, ZKI represent maximum expected gyro angular rate drift in inertial reference:

ΔX=|rate of change of XGI−rate of change of XM|
ΔY=|rate of change of YGI−rate of change of YM|
ΔZ=|rate of change of ZGI−rate of change of ZM|
Pitch=n(YGI, Accelerometer data, Magnetometer data)
Roll=fn(XGI, Accelerometer data, Magnetometer data)
Heading=fn(ZGI, Magnetometer data)
If ΔX>XKI, XM=XM+ΔX Δt
If ΔY>YKI, YM=YM+ΔY Δt Typically, in accordance with the method of the present invention, if the change is greater than the expected drift error of the rate sensors, which is a predetermined threshold value, it is assumed that the magnetometer is being affected by a local change in magnetic field and the rate sensor data is used to compensate for the effects of the change in the local magnetic field.

Referring now to FIG. 3, FIG. 3 diagrammatically illustrates an alternative flow chart, similar to FIG. 1, in accordance with the compensation method of the present invention, that accomplishes the above described method which utilizes the complex scheme represented by the above algorithm. It will be apparent to one of ordinary skill in the art, that the steps of the method illustrated in FIG. 3 may be performed in different orders without departing from the spirit and scope of the present invention. Like with the flow chart illustrated in FIG. 1, the flow chart of FIG. 3 is illustrated as an iterative control loop 300 for repetitively compensating for any defined significant changes in the accuracy of the heading system due to soft iron magnetic disturbances. In carrying out this compensation method, the steps may comprise saving the current value of the magnetometer readings; subtracting the current value of the magnetometer readings from the previously saved magnetometer values; dividing the difference in magnetometer readings by the time period to obtain the rate of change; subtracting the determined magnetometer rate of change from the average rate sensor change for the time period; and, if the difference is less than or equal to the maximum expected drift of the rate sensor, using the magnetometer data to compensate for the rate sensor drift. However, if that is not the case, then the rate sensor data is used to compensate for the effect of soft iron on the magnetometer.

Alternatively, as referred to above, more elaborate schemes may be utilized in which the rates of change of the magnetometers and rate sensors for each axis are compared, such as in the system 200 illustrated in FIG. 2 employing a triaxial gyro 104, triaxial magnetometer 102, and triaxial accelerometer 212. In such an instance, the compensation method of the present invention may comprise the steps of reading the magnetometer data for each axis; reading the gyro data for each axis; converting the gyro data from body to inertial coordinates; determining the rate of change of each magnetic axis based on the magnetometer readings over time; comparing the rate of change of each magnetic axis with the inertial coordinate rate of change of the gyro for the same axis; and, if the difference in rates of change is greater than a predetermined value, recording the difference and using it as a bias to correct for the soft iron impact on each axis of the magnetometer. However, if that is not the case, then the magnetometer values are used in the algorithm such as the Kalman filter algorithm described below which is as follows:

| Predict | |
| --- | --- |
| Predicted state estimate | $\hat{x}_{k|k-1} = F_k \hat{x}_{k-1|k-1} + B_k u_k$ |
| Predicted estimate covariance | $P_{k|k-1} = F_k P_{k-1|k-1} F_k^T + Q_k$ |
| Update | |
| Innovation | $\tilde{y}_k = z_k - H_k \hat{x}_{k|k-1}$ |
| Innovation covariance | $S_k = H_k P_{k|k-1} H_k^T + R_k$ |
| Optimal Kalman gain | $K_k = P_{k|k-1} H_k^T S_k^{-1}$ |
| Updated state estimate | $\hat{x}_{k|k} = \hat{x}_{k|k-1} + K_k \tilde{y}_k$ |
| Updated estimate covariance | $P_{k|k} = (I - K_k H_k) P_{k|k-1}$ | to correct for the drift in the gyros. Alternatively, the accelerometer data can be used in this algorithm to augment the magnetometer data during no acceleration modes such as un-accelerated straight and level motion of the vehicle or when the vehicle is stationary.

In the above situation, where the compensation method of the present invention is employed in connection with each axis, such as in the system 200 of FIG. 2, in which the compensation method compares and compensates for effects of soft iron on each of the magnetometers, an internal model of the expected magnetic readings for each magnetometer is developed that estimates the expected value of each magnetometer based on estimated heading, pitch and roll of the aircraft as determined by the gyros and accelerometers. This model is constantly updated by taking into account the magnetometer readings and, as such, the change in the estimated magnetometer readings is preferably compared with the change in the actual magnetometer reading for each axis and is used to compensate for the effects of soft iron on each magnetometer or to correct the drift on each gyro.

As illustrated in FIG. 3, the steps involved in iteratively carrying out the compensation method of the present invention may involve reading and processing the magnetometer 102, accelerometer 212, and gyro 104 data to provide signals corresponding to any change in magnetometer value and gyro value. This step is represented by block 312 in FIG. 3. These signals are then compared against each other to determine any actual change since the previous reading. This step is represented by block 314 in FIG. 3. A determination is then made if any detected difference in value from the previous reading is greater than the expected gyro drift over the period since the previous reading. This step is represented by block 316 in FIG. 3. If as a result of this comparison the difference exceeds the expected gyro drift, then, in accordance with the compensation method illustrated in FIG. 3, the gyro change plus the last magnetometer reading is used for the magnetometer value, represented by block 318 in FIG. 3, and the calibration value for the magnetometer is updated using the difference, represented by block 320 in FIG. 3. The corrected gyro and magnetometer values are then output, represented by block 322 in FIG. 3, and the best estimate of attitude and heading is computed, represented by block 324 in FIG. 3, and the steps are iteratively periodically repeated, as illustrated in FIG. 3. On the other hand, if the detected difference is less than the expected gyro drift over the period since the previous reading, the calibration value for the gyro is updated using the magnetometer and the accelerometer data. This step is represented by block 326 in FIG. 3, and then the corrected gyro and magnetometer values are output, as represented by block 322, the best estimate of attitude and heading is computed, represented by block 324, and the process is iteratively periodically repeated.

While there have shown and described various novel features of the invention, it will be understood that various omissions and substitutions and changes in the form and details of the methods described and devices illustrated, and in their operation, may be made by those skilled in the art without departing from the spirit and scope of the invention which is defined by the scope of the claims appended hereto.

What is claimed is:

1. A method for compensating for soft iron magnetic disturbances in a heading reference system, said system comprising a heading gyro disposed along a heading measurement axis and a magnetometer coupled to said heading gyro for providing an accurate heading relative to magnetic north; said method comprising the steps of:
   detecting changes in said magnetometer due to soft iron magnetic disturbances during a detection period for providing a first detected magnitude of change;
   detecting changes in said heading gyro relative to magnetic north during said detection period for providing a second detected magnitude of change;
   comparing said first and second detected magnitude of changes for providing a potential difference value of change;
   providing a predetermined acceptable threshold value of change based on a gyro drift;
   determining if said potential difference value of change exceeds said predetermined acceptable threshold value of change; and
   providing a heading correction value to said heading reference system when said potential difference value of change exceeds said predetermined acceptable threshold value of change for enabling adjustment of said heading gyro to maintain said accurate heading in the face of said soft iron magnetic disturbances.

2. The compensation method in accordance with claim 1 further comprising the step of periodically correcting said heading gyro utilizing data provided from said magnetometer.

3. The compensation method in accordance with claim 1 wherein said heading correction value providing step comprises the step of providing said heading correction value only when said potential difference value is on the order of a predetermined expected gyro drift over a period since a last adjustment was made to said heading gyro.

4. The compensation method in accordance with claim 1 wherein said heading reference system comprises an aircraft heading reference system.

5. The compensation method in accordance with claim 4 wherein said aircraft heading reference system comprises an integrated standby unit.

6. The compensation method in accordance with claim 1 wherein said heading reference system comprises a vehicle inertial system.

7. The compensation method in accordance with claim 6 wherein said system is subject to local electric field changes, said compensation method further comprising the step of providing a source of heading to said vehicle inertial system subject to variations resulting from said local electric field changes.

8. The compensation method in accordance with claim 1 wherein said compensation method further comprises blending said heading gyro measurements with said magnetometer measurements, said predetermined acceptable threshold value comprising a gyro error covariance.

9. The compensation method in accordance with claim 8 wherein said blending step further comprises the step of blending said heading gyro measurements with said magnetometer measurement using a Kalman filter.

10. The compensation method in accordance with claim 1 wherein said heading reference system comprises a primary attitude and heading reference system.

11. The compensation method in accordance with claim 1 wherein said heading reference system comprises a secondary attitude and heading reference system.

12. The compensation method in accordance with claim 1 wherein said heading reference system comprises a primary air data and attitude heading reference system.

13. The compensation method in accordance with claim 1 wherein said heading reference system comprises a secondary air data and attitude heading reference system.

14. The compensation method in accordance with claim 1 wherein said heading reference system comprises a primary inertial navigation system.

15. The compensation method in accordance with claim 1 wherein said heading reference system comprises a secondary inertial navigation system.

16. The compensation method in accordance with claim 1 wherein said heading reference system comprises a plurality of heading measurement axes, said heading gyro being disposed along said plurality of heading measurement axes, said method further comprising the step of performing said steps for said plurality of axes for providing said heading correction value for said plurality of axes for maintaining said accurate heading in the face of said soft iron magnetic disturbances.

17. The compensation method in accordance with claim 16 wherein said plurality of axes comprises each of said axes for said heading reference system.

18. The compensation method in accordance with claim 1 further comprising the step of correcting said magnetometer for the effect of soft iron magnetic disturbances utilizing data provided from said heading gyro.

19. The compensation method in accordance with claim 1 wherein said heading correction value providing step correction value providing step comprises the step of providing said heading correction value in accordance with the expression Heading=fn(GH, MH) for $\Delta H =< k$
Heading=GH and MH=MH+AH for $\Delta H > k$,
where k is a positive constant derived from expected gyro drift over the period $\Delta t$;

AMH is the change in magnetometer derived heading over the period At;

AGH is the change in gyro derived heading over the period At.

20. The compensation method in accordance with claim 19 wherein said heading reference system comprises an aircraft heading reference system.

21. The compensation method in accordance with claim 20 wherein said aircraft heading reference system comprises an integrated standby unit.

22. The compensation method in accordance with claim 19 wherein said heading reference system comprises a vehicle inertial system.

23. The compensation method in accordance with claim 19 wherein said heading reference system comprises an attitude and heading reference system.

24. The compensation method in accordance with claim 19 wherein said heading reference system comprises an air data and attitude heading reference system.

25. The compensation method in accordance with claim 19 wherein said heading reference system comprises an inertial navigation system.

26. The compensation method in accordance with claim 1 wherein said heading correction value providing step comprises the step of providing said heading correction value in accordance with the expression Heading=fn(ZGI, Magnetometer data)

If AX>XKI, XM=XM+AX At

If AY>YKI, YM=YM+AY At, where XGI, YGI, ZGI represent change of angle in X, Y, Z axis as derived from gyros in inertial reference and XM, YM, ZM represent X, Y, Z magnetometer readings and XKI, YKI, ZKI represent maximum expected gyro angular rate drift in inertial reference:

AX=Irate of change of XGI−rate of change of XMI

AY=Irate of change of YGI−rate of change of YMI

AZ=Irate of change of ZGI−rate of change of ZMI

Pitch=fn(YGI, Accelerometer data, Magnetometer data)

Roll=fn(XGI, Accelerometer data, Magnetometer data).

27. A heading reference system for compensating for soft iron magnetic disturbances and providing an accurate heading relative to magnetic north, the system comprising:

at least one magnetometer capable of measuring a first magnetic data;

at least one heading gyro capable of measuring a first angle rate data;

an electronic storage device capable of storing the first magnetic data and the first angle rate data; and a microprocessor coupled to the at least one magnetometer, the at least one heading gyro and the electronic storage device being adapted to:

receive the first magnetic data, the first angle rate data, a second magnetic data and a second angle rate data;

compute a first magnetic magnitude of change between the first and the second magnetic data;

compute a second angle rate magnitude of change between the first and the second angle rate data;

compare a change between the first magnetic magnitude of change and the second angle rate magnitude of change to a threshold value based on a gyro drift;

compute a calibration value for the at least one magnetometer or the at least one heading gyro based on the comparison; and calibrate the at least one magnetometer or the at least one heading gyro using the calibration value.

28. The system in accordance with claim 27 wherein the second magnetic data is used as a heading when the threshold value is not exceeded.

29. The system in accordance with claim 28 wherein computing the first magnetic magnitude of change and the second angle rate magnitude of change happens iteratively.

30. The system in accordance with claim 27 wherein computing the first magnetic magnitude of change and the second angle rate magnitude of change happens iteratively.

31. The system in accordance with claim 30 wherein said heading reference system comprises an aircraft heading reference system.

32. The system in accordance with claim 31 wherein said aircraft heading reference system comprises an integrated standby unit.

33. The system in accordance with claim 27 wherein said heading reference system comprises an aircraft heading reference system.

34. The system in accordance with claim 33 wherein said aircraft heading reference system comprises an integrated standby unit.

35. The system in accordance with claim 27 wherein said heading gyro comprises a triaxial heading gyro disposed along each heading measurement axis, and said magnetometer comprises a triaxial magnetometer.

36. The system in accordance with claim 35 wherein the calibration value is computed for each of the measurement axes.

\* \* \* \* \*